US011905908B2

(12) United States Patent
Phillips et al.

(10) Patent No.: US 11,905,908 B2
(45) Date of Patent: Feb. 20, 2024

(54) FUEL SYSTEM MANAGEMENT DURING CYLINDER DEACTIVATION OPERATION

(71) Applicant: Cummins Inc., Columbus, IN (US)

(72) Inventors: Ross A. Phillips, Columbus, IN (US); Donald J. Benson, Columbus, IN (US); J. Steven Kolhouse, Columbus, IN (US); Avra Brahma, Fishers, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/498,003

(22) Filed: Oct. 11, 2021

(65) Prior Publication Data

US 2022/0120233 A1 Apr. 21, 2022

Related U.S. Application Data

(60) Provisional application No. 63/092,613, filed on Oct. 16, 2020.

(51) Int. Cl.
*F02D 41/38* (2006.01)
*F02D 41/00* (2006.01)

(52) U.S. Cl.
CPC ..... *F02D 41/3845* (2013.01); *F02D 41/0087* (2013.01); *F02D 2200/0602* (2013.01)

(58) Field of Classification Search
CPC ............. F02D 41/3845; F02D 41/0087; F02D 2200/0602
See application file for complete search history.

(56) References Cited

U.S. PATENT DOCUMENTS

| | | | |
|---|---|---|---|
| 6,866,025 B1 | 3/2005 | Maass | |
| 9,157,393 B2 | 10/2015 | Fulton et al. | |
| 9,657,700 B2 | 5/2017 | Schanz et al. | |
| 9,664,130 B2 | 5/2017 | Wilcutts et al. | |

(Continued)

FOREIGN PATENT DOCUMENTS

EP 1073834 A1 2/2001

OTHER PUBLICATIONS

Chinese Office Action, Chinese Appin. No. 202111190663.0, 20 pgs., dated Mar. 8, 2023.

(Continued)

*Primary Examiner* — Grant Moubry
*Assistant Examiner* — Ruben Picon-Feliciano
(74) *Attorney, Agent, or Firm* — Taft Stettinius & Hollister

(57) ABSTRACT

A method for operating an engine fueling system to manage fuel in an accumulator supplying fuel to an engine including multiple cylinders comprising monitoring fuel load in the accumulator, determining that the engine is operating in a cylinder deactivation mode such as a skip-fire mode during which one or more fueling events to one or more of the cylinders is being skipped, and controlling a supply of fuel from a fuel pump to the accumulator during the cylinder deactivation mode operation. In embodiments, controlling the supply of fuel includes causing fuel to be supplied from the fuel pump to the accumulator if the monitored fuel load is less than or equal to a first fuel load, and causing fuel to be not supplied from the fuel pump to the accumulator if the monitored fuel load is greater than the first load value. Controlling the supply of fuel may comprise controlling the supply of fuel during each fueling event cycle of each deactivated cylinder.

25 Claims, 3 Drawing Sheets

(56) References Cited

U.S. PATENT DOCUMENTS

| | | | | |
|---|---|---|---|---|
| 2009/0150046 | A1* | 6/2009 | Achleitner | F02D 41/3863 123/447 |
| 2016/0356237 | A1* | 12/2016 | Pursifull | F02D 41/20 |
| 2016/0377007 | A9* | 12/2016 | Wilcutts | F02D 41/3058 701/104 |
| 2019/0338720 | A1* | 11/2019 | Banker | F02D 41/3854 |

OTHER PUBLICATIONS

Chinese Office Action, Chinese Appin. No. 202111190663.0, 22 pgs., dated Aug. 14, 2023.

* cited by examiner

FUEL SYSTEM MANAGEMENT DURING CYLINDER DEACTIVATION OPERATION

RELATED APPLICATIONS

This application claims priority to U.S. Provisional Patent Application No. 63/092,613, filed Oct. 16, 2020, the subject matter of which is incorporated herein by reference.

FIELD

This disclosure relates generally to fuel systems for engines operating in cylinder deactivation modes.

BACKGROUND

Engine systems are generally known. There remains, however, a continuing need for improved engine systems. In particular, there is a need for engine systems that offer enhanced efficiency. Engine systems of these types that provide enhanced management of noise, vibration and harshness (NVH) would be especially advantageous.

SUMMARY

Disclosed embodiments include a fueling system that provides efficient operation of engine systems. Noise, vibration and harshness (NVH) of the engine system may be enhanced through use of the fueling system.

Embodiments include a method for operating an engine fueling system to manage fuel in an accumulator supplying fuel to an engine including multiple cylinders. An example of the method comprises: monitoring fuel load in the accumulator; determining that the engine is operating in a cylinder deactivation mode during which one or more fueling events to one or more of the cylinders is being skipped; and controlling a supply of fuel from a fuel pump to the accumulator during the cylinder deactivation mode operation by: causing fuel to be supplied from the fuel pump to the accumulator if the monitored fuel load is less than or equal to a first load value; and causing fuel to be not supplied from the fuel pump to the accumulator if the monitored fuel load is greater than the first load value.

As examples of these embodiments, causing fuel to be supplied from the fuel pump to the accumulator may comprise actuating a valve to cause the fuel to be supplied from the fuel pump to the accumulator. Causing fuel to be not supplied from the fuel pump to the accumulator may comprise actuating a valve to prevent fuel from being supplied from the fuel pump to the accumulator. Actuating the valve to prevent fuel from being supplied from the fuel pump to the accumulator may comprise actuating the valve to cause fuel from the fuel pump to be recirculated.

As examples of these embodiments, determining that the engine is operating in a cylinder deactivation mode may comprise determining that the engine is operating in a skip-fire mode, and optionally a dynamic skip-fire mode. Controlling the supply of fuel may comprise controlling the supply of fuel during each fueling event cycle of each deactivated cylinder.

In any of these embodiments, the first load value may be a value representative of a minimum operational load.

Examples of these embodiments may further comprise: determining that an incremental engine load is requested; and controlling a supply of fuel from the fuel pump to the accumulator during the cylinder deactivation mode operation when an incremental engine load is requested by: causing fuel to be supplied from the fuel pump to the accumulator if the monitored fuel load is less than or equal to a second load value, and wherein the second load value is greater than the first load value; and causing fuel to be not supplied from the fuel pump to the accumulator if the monitored fuel load is greater than the second load value. The second load value may be a value representative of a maximum operational load.

As examples of these embodiments, monitoring fuel load in the accumulator may comprise monitoring fuel pressure in the accumulator, and the first and/or second load values are pressure values.

As examples of these embodiments, determining that the engine is operating in a cylinder deactivation mode may comprise receiving a signal representing the cylinder deactivation mode operation. Receiving a signal representing the cylinder deactivation mode operation may comprise receiving a signal representative of each skipped fueling event of each deactivated cylinder.

Embodiments also include a method for operating an engine fueling system to manage fuel in an accumulator supplying fuel to an engine including multiple cylinders. Examples of the method comprise: monitoring fuel load in the accumulator; determining that the engine is operating in a cylinder deactivation mode during which one or more fueling events to one or more of the cylinders is being skipped; determining that an incremental engine load is requested when the engine is operating in the cylinder deactivation mode; and controlling a supply of fuel from a fuel pump to the accumulator when an incremental engine load is requested during the cylinder deactivation mode operation by: causing fuel to be supplied from the fuel pump to the accumulator if the monitored fuel load is less than or equal to a second load value, wherein the second load value is greater than a first load value that defines an operational load of the accumulator; and causing fuel to be not supplied from the fuel pump to the accumulator if the monitored fuel load is greater than the second load value.

As examples of these embodiments, the first load value may define an operational minimum load value of the accumulator. The second load value may be a value representative of a maximum operational load.

As examples of these embodiments, causing fuel to be supplied from the fuel pump to the accumulator may comprise actuating a valve to cause the fuel to be supplied from the fuel pump to the accumulator. Causing fuel to be not supplied from the fuel pump to the accumulator may comprise actuating a valve to prevent fuel from being supplied from the fuel pump to the accumulator. Actuating the valve to prevent fuel from being supplied from the fuel pump to the accumulator may comprise actuating the valve to cause fuel from the fuel pump to be recirculated.

As examples of these embodiments, determining that the engine is operating in a cylinder deactivation mode comprises determining that the engine is operating in a skip-fire mode, optionally a dynamic skip-fire mode; and controlling the supply of fuel comprises controlling the supply of fuel during each fueling event cycle of each deactivated cylinder.

As examples of these embodiments, monitoring fuel load in the accumulator may comprise monitoring fuel pressure in the accumulator, and the first and/or second load values are pressure values.

As examples of these embodiments, determining that the engine is operating in a cylinder deactivation mode may comprise receiving a signal representing the cylinder deactivation mode operation; and determining that the incremental engine load is requested may comprise receiving a signal representative of an incremental engine load request. Receiving a signal representing the cylinder deactivation mode operation may comprise receiving a signal representative of each skipped fueling event of each deactivated cylinder.

Embodiments include an engine control unit configured to implement any and all of the exemplary methods described above. Embodiments include an engine fueling system comprising the engine control unit described above.

DETAILED DESCRIPTION

Figure 1:
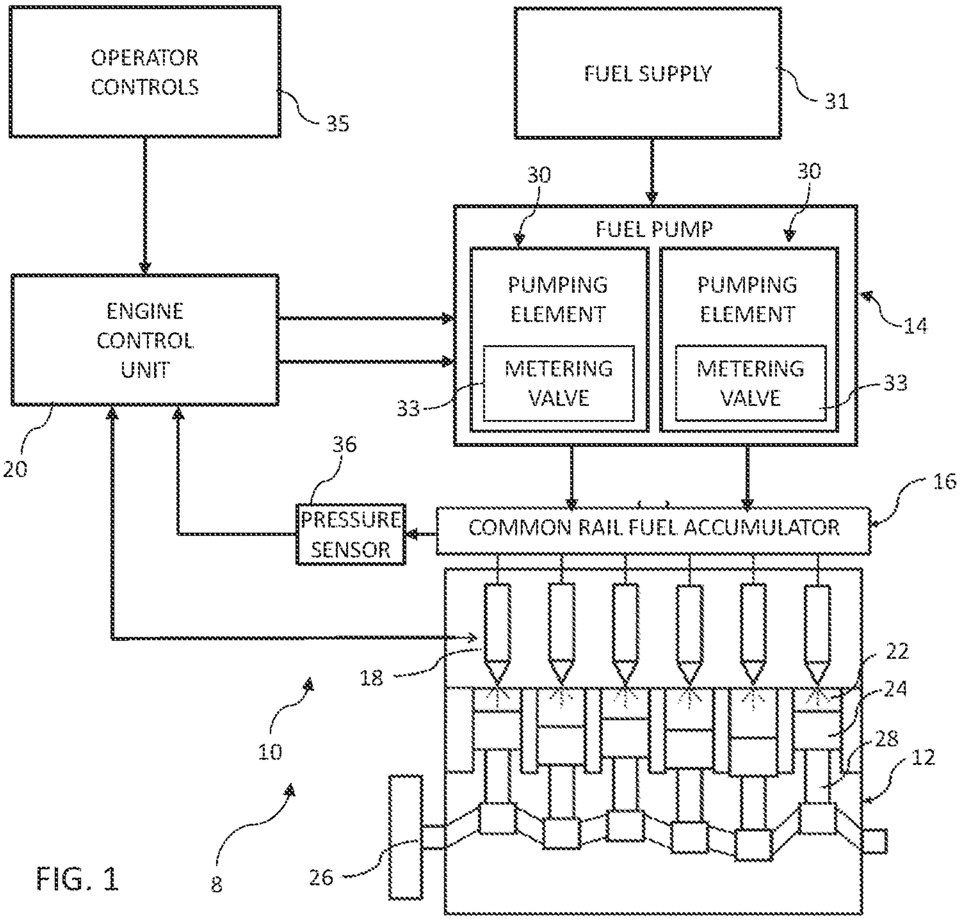
FIG. 1 is a diagrammatic illustration of an engine system including a fueling system, in accordance with embodiments.

FIG. 1 is a diagrammatic illustration of a vehicle engine system 8 including a fueling system 10 and internal combustion engine 12 in accordance with embodiments. As shown, fueling system 10 includes a fuel pump 14, a common rail fuel accumulator 16, a plurality of fuel injectors 18 and an engine control unit (ECU) 20. Engine 12 includes a plurality of cylinders 22 in which a plurality of pistons 24 reciprocate under power provided by fuel combustion, thereby causing a crankshaft 26 to rotate via a corresponding plurality of connecting rods 28. Fuel pump 14, which is shown in this example as having two pumping elements or units 30, receives fuel from a fuel source 31, pressurizes the fuel, and provides the pressurized fuel to accumulator 16. Each pumping unit 30 includes a metering valve 33 which controls the flow of fuel to and from the pumping unit. Fuel injectors 18, which are coupled to and receive fuel from accumulator 16 under control of ECU 20, deliver fuel (also under control of the ECU) to cylinders 22 at specified times during the engine cycle as is well known in the art. Operator controls 35, which may for example include a throttle, are coupled to the ECU 20.

ECU 20 receives signals representative of an amount or load of fuel in the accumulator 16. The illustrated embodiments of controller 20 monitors pressure measurements from a pressure sensor 36 coupled to accumulator 16. The pressure measurements indicate the pressure of fuel in accumulator 16.

As described in greater detail below, ECU 20 is configured to control the operation of engine system 8 in one or more cylinder deactivation modes. In connection with the cylinder deactivation control, ECU 20 controls the operation of the metering valves 33 to manage or optimize the load or pressure of fuel in the accumulator 16. Parasitic loads on the engine 12 can be managed (e.g., increased or decreased) to optimize the operation of engine system 8. Thermal management of the engine system 8 and/or other components of the vehicle or system in which the engine system is incorporated, such as exhaust aftertreatment systems, can be optimized. Over-pressure events in the accumulator 16 can be eliminated or minimized. Undesired noise, vibration and harshness (NVH) of the motor system 8 can also be reduced.

Cylinder deactivation modes and associated control algorithms are generally known and disclosed, for example, in the Subramanian et al. U.S. Patent Application Publication No. 2020/0218258, the entire disclosure of which is incorporated herein in its entirety for all purposes. One such cylinder deactivation mode is sometimes referred to as fixed pattern deactivation. During fixed pattern deactivation, a designated group of one or more cylinders of an engine is simultaneously deactivated for a period of time when reduced displacement of the engine is desired. No fuel is delivered to the deactivated cylinders as long as they are deactivated. Another known cylinder deactivation mode that varies the effective displacement of an engine is sometimes known as skip-fire deactivation. Skip-fire deactivation contemplates skipping the fueling events and firing of certain cylinders during selected opportunities. For example, a particular cylinder may be fired during one engine cycle, may be skipped during the next engine cycle, and may be skipped or fired during the a subsequent engine cycle. Skip-fire engine operation may be distinguished from fixed pattern deactivation in which the designated group of cylinders are deactivated substantially simultaneously and remain deactivated as long as the engine remains in the same displacement mode of operation. During skip-fire mode operation, the engine control unit may individually control the associated fueling event and firing of each cylinder during each cycle of the cylinder. For example, during cylinder deactivation mode operation sometimes known as dynamic skip-mode operation, the fueling event and firing decisions for each cylinder (i.e., whether to skip or to fire a particular cylinder during a particular working cycle) are made in real time—often immediately before the working cycle begins, and often on an individual cylinder fueling event and firing opportunity by individual cylinder fueling event and firing opportunity basis. The use of any known or otherwise conventional cylinder deactivation control modes by the engine system 8 are contemplated by this disclosure.

Figure 2:
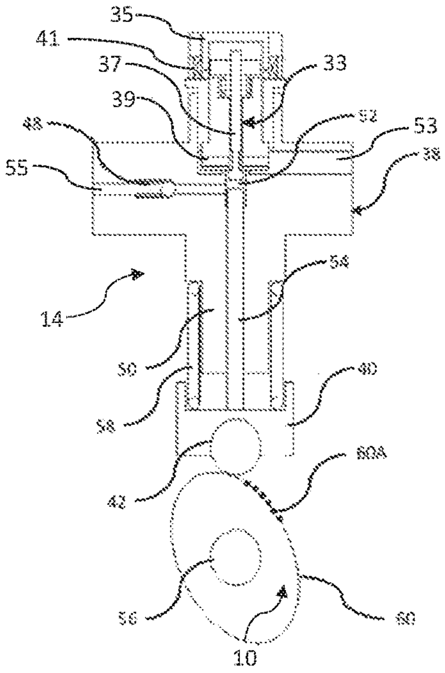
FIG. 2 is a cross sectional illustration of a pumping unit of the fueling system, in accordance with embodiments.

FIG. 2 is a diagrammatic illustration of a pumping unit 30 and associated inlet or metering valve 33 in accordance with embodiments. As shown, pumping unit 30 includes a housing 38, a tappet 40 and a roller 42. A pumping chamber 52 is in fluid communication with an inlet 53 and an outlet 55. Inlet 53 is configured to be fluidly coupled to the fuel supply 31, and outlet 55 is configured to be fluidly coupled to the common rail fuel accumulator 16. Fuel pump 14 is a high pressure fuel pump in embodiments, and the pumping units 30 may be coupled to the fuel supply 31 through a low pressure fuel pump as is generally known or otherwise conventional and disclosed generally, for example, in the Fulton et al. U.S. Pat. No. 9,157,393.

Metering valve 33 includes a solenoid 35, actuation rod 37 and seat 39. Seat 39 is positioned in the pumping chamber 52, and is configured for reciprocal motion between open and closed positions in connection with the operation of the valve. Seat 39 is actuated and driven between the open and closed positions by the solenoid 35 via the actuation rod 37 in response to valve control signals provided by the ECU 20. When the seat 39 is in the open position, the inlet 53 is in fluid communication with the pumping chamber 52, allowing fuel to flow between the inlet and pumping chamber. When the seat 39 is in the closed position, the inlet 53 is fluidly sealed from the pumping chamber 52, thereby preventing the flow of fuel between the inlet 53 and pumping chamber 52. Metering valve 33 functions as a recirculation valve, causing fuel to be recirculated back to the inlet 53 and toward the fuel supply 31 when the seat 39 is actuated to its open position. In embodiments, valve 33 is a normally open valve, and seat 39 is biased to the open position by a spring 41. Other embodiments include other types of valves, such as for example normally closed valves.

Solenoid 35 of the metering valve 33 is shown disposed at an upper end of housing 38 in the illustrated embodiments. An outlet valve 48 is also disposed in housing 38 between the pumping chamber 52 and the outlet 55. Housing 38 includes a barrel 50 which defines the pumping chamber 52. A plunger 54 coupled to tappet 40 reciprocates in pumping chamber 52, compressing any fuel in the pumping chamber during upward pumping strokes (when the seat 39 is in the closed position) for delivery to outlet 55 through outlet valve 48, and from there, to accumulator 16. Fuel is delivered to pumping chamber 52 through metering valve 33 during downward filling strokes of the plunger 54 when the seat 39 is in the open position.

Reciprocal motion of plunger 54 is powered by rotational motion of camshaft 56 (which is coupled to crankshaft 26 shown in FIG. 1) and a downward biasing force of return spring 58. As camshaft 56 rotates, an eccentric lobe 60 mounted to camshaft 56 also rotates. Roller 42 remains in contact with lobe 60 as a result of the biasing force of spring 58. Accordingly, during half of a revolution of camshaft 56, lobe 60 pushes roller 42 (and tappet 40 and plunger 54) upwardly, and during the other half spring 58 pushes roller 42 (and tappet 40 and plunger 54) downwardly into contact with lobe 60.

The operation of metering valve 33 is controlled by ECU 20, which actuates the valve to an open state and a closed state to cause pumping unit 30 to controllably deliver quantities of fuel to accumulator 16 according to the various control methodologies described below. ECU 20 actuates the metering valve 33 to cause the seat 39 to be in the open position and prevent the flow of fuel to the accumulator 16 during pumping events when the metering valve is in the open state. ECU 20 actuates the metering valve 33 to cause the seat 39 to reciprocate between the closed and open positions and to pump fuel to the accumulator 16 during pumping events when the metering valve is actuated to the closed state.

Although only one pumping unit 30 is shown in FIG. 2 for purposes of example, the second and any additional pumping units 30 can be substantially the same as or similar to that described in connection with FIG. 2. The Benson U.S. Patent Application Publication No. 2019/0331053 discloses an example of a fuel pump 14 that may be used in embodiments, and the entire disclosure of the Benson publication is incorporated herein in its entirety for all purposes. In embodiments, plungers such as 54 of the two pumping units 30 have the same surface area. The inlets such as 53 of the two pumping units 30 may be fluidly coupled to one another and/or to any low pressure pump system (not shown). Either or both of the metering valves 33 of the two pumping units 30 can be actuated to their open and/or closed states independently by the ECU 20 to control the pressure of fuel in the accumulator 20.

Figure 3:
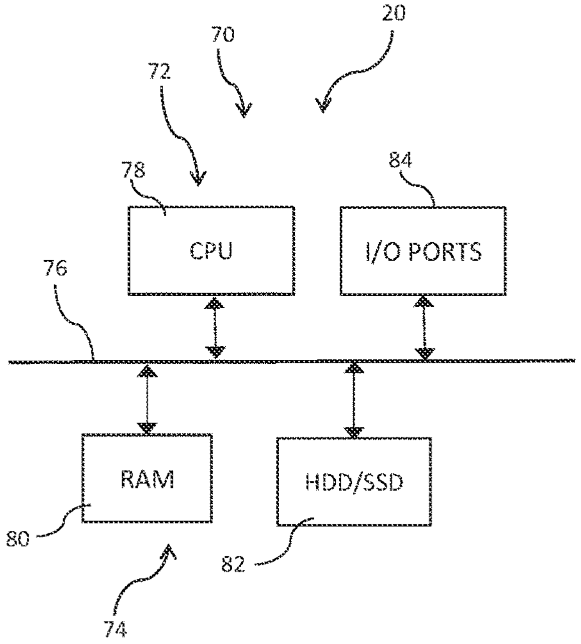
FIG. 3 is a diagrammatic illustration of components of an engine control unit (ECU), in accordance with embodiments.

FIG. 3 is a diagrammatic illustration of exemplary functional components of the ECU 20 in accordance with embodiments. The illustrated embodiments include a processing system 70 comprising processing components 72 and storage components 74 coupled by a bus 76. Processing components 72 may, for example, include one or more central processing units (CPUs) 78 providing the processing functionality of the fueling system 10. The storage components 74 may include RAM memory 80, hard disk drive (HDD) and/or solid state drive (SSD) memory 82, providing the information and other data storage functionality of the fueling system 10. For example, operating system and other software used by the processing components 72 to implement the cylinder deactivation mode control and associated accumulator fuel pressure optimization methods and algorithms of the system 10 as described herein may be stored in the storage components 74. Components of the ECU 20 can be implemented as programmed microprocessors, application specific integrated circuits (ASICs), controllers and/or discrete circuit components. Other embodiments of the ECU 20 are implemented using other conventional or otherwise known systems or devices.

The embodiments of ECU 20 illustrated in FIG. 3 also include input/output (I/O) ports 84 through which the ECU 20 can receive and transmit information or other data. For example, in embodiments, the ECU 20 may be coupled by input/output ports 84 to operator controls 35 such as components providing information representative of commands such as the operator's actuation of the throttle of the engine system 8 or operator selection of a cylinder deactivation mode. Signals or other information representative of the pressure in the common rail fuel accumulator 16 provided by the pressure sensor 36 may be coupled to the ECU 20 through input/output ports 84. Control signals generated and provided by the ECU 20 to control the actuation of the metering valves 33 and fuel injectors 18 can be coupled through input/output ports 84. Input/output ports 84 can also be coupled to other components of the engine system 8 (not shown). For example, in embodiments ECU 20 may connected through the input/output ports 84 to receive information from and/or provide control signals to a transmission (e.g., to control gear shifting) and/or exhaust aftertreatment system of the engine system (not shown).

Common rail fuel accumulator 16 is a reservoir for pressurized fuel that is coupled to each of the fuel injectors 18. In response to control signals from the ECU 20, the fuel injectors 18 deliver fuel from the accumulator 16 to the associated cylinders 22. The pressure within the accumulator 16 is monitored by the ECU 20 based on the signals received from the pressure sensor 36. Based on the monitored pressure and the pressure management algorithms associated with cylinder deactivation modes, ECU 20 actuates the one or more metering valves 33 to maintain the pressure within the accumulator 16 at certain desired or predetermined levels.

In embodiments, the ECU 20 may operate fueling system 10 during certain periods to maintain the fuel pressure within the common rail fuel accumulator 16 at a predetermined first or minimum (MIN) pressure level. The MIN pressure level may, for example, be an operational pressure level sufficient to enable to engine 12 to respond adequately to anticipated fueling commands during typical normal or routine operation of the engine system 8. In embodiments the ECU 20 may operate the fueling system 10 during certain periods to maintain the fuel pressure within the accumulator 16 at a second or maximum (MAX) pressure level. The MAX pressure level may be a level that is greater than the MIN level, and in embodiments is a level that allows the engine 12 to respond adequately to relatively short term or incremental fueling commands requiring fuel amounts greater than those needed during the normal or routine operation of the engine system 8. For example, in response to operator commands such as throttle actuations requiring relatively high amounts of engine power such as high acceleration, or in response to other operations of the engine system 8 controlled by ECU 20 such as gear shifting events or exhaust aftertreatment system actuation that may benefit from incremental and greater-than-normal power output from the engine 12, the ECU may operate the fueling system 10 to maintain the fuel pressure within accumulator 16 at the MAX level. In embodiments, the MAX level is a level is a maximum operating level that is less that a maximum pressure specification or rating for the accumulator 16. Embodiments of accumulator 16 may also include a high pressure relieve valve, such as a check valve (not shown) to relieve any pressures within the accumulator that might exceed the maximum pressure rating for the accumulator.

Figure 4:
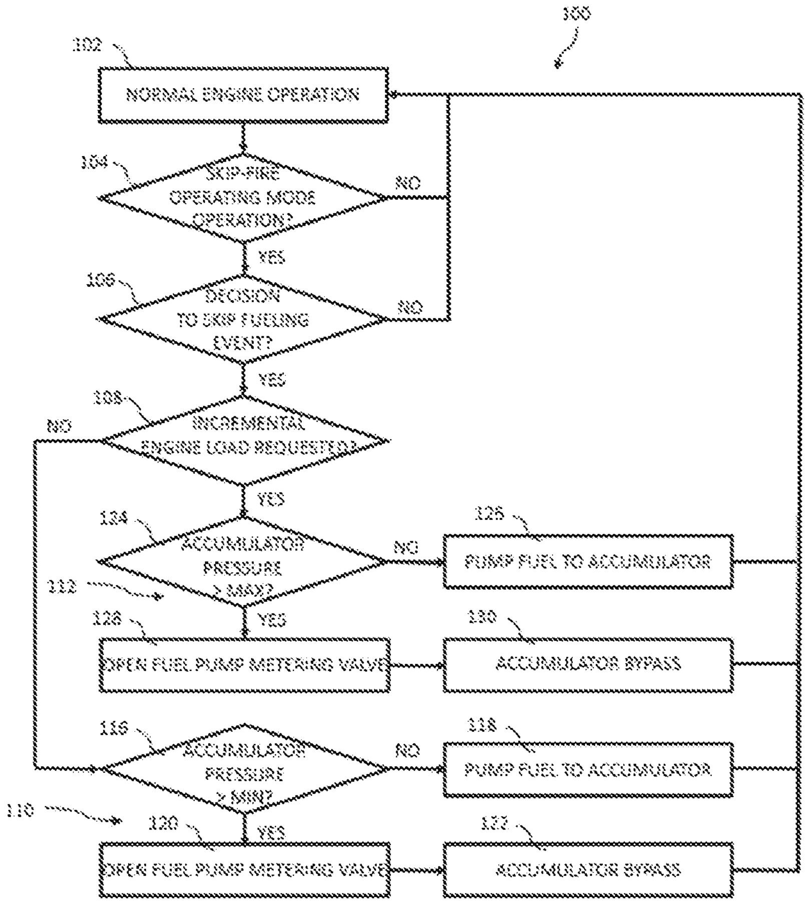
FIG. 4 is a flow diagram of a cylinder deactivation mode accumulator fueling control method, in accordance with embodiments.

FIG. 4 is a diagrammatic illustration of a cylinder deactivation mode accumulator fueling control method 100 by which the fueling system 10 can be operated in accordance with embodiments. ECU 20 can provide the control functionality of the method 100. As shown by step 102, the ECU 20 operates in a normal engine operating mode as is known in the art. While controlling the engine 12 during normal engine operation at step 102, ECU 20 monitors or otherwise determines whether operation in a cylinder deactivation mode is commanded (step 104). In the illustrated embodiments, the ECU 20 continues to operate in the normal engine operating mode (step 102) as long as cylinder deactivation mode operation is not determined at step 104. During normal engine operation at step 102, ECU 20 may control the fuel pump 14 in a conventional manner by, for example, operating the pumping units 30 with the metering valves 33 in the closed states.

FIG. 4 illustrates the ECU 20 determining whether engine operation in the skip-fire operating mode is being commanded or performed at step 104. In embodiments, for example, ECU 20 can determine that dynamic skip-fire operation is being commanded or performed at step 104. In other embodiments the ECU 20 may command or determine operation in other cylinder deactivation modes, such as for example fixed-pattern cylinder deactivation. The cylinder deactivation mode operation determined at step 104 may, for example, have been initiated by an operator of the engine system 8 using operator controls 35. In other situations the ECU 20 may have commanded operation in the cylinder deactivation mode based on its control algorithm (e.g., during normal engine operation) and monitored vehicle operating characteristics. As discussed above, when operating in the cylinder deactivation mode at step 104, the ECU 20 can implement any of known or otherwise conventional control algorithm appropriate for the operating mode and application. If it is determined at step 104 that the ECU 20 is not operating in cylinder deactivation mode, the ECU may return to normal engine mode operation such as that of step 102.

Following a determination that cylinder deactivation mode operation is being performed (step 104), the ECU 20 determines whether a fueling event is being skipped in connection with that operation as indicated by step 106. For example, ECU 20 may determine whether a fueling event is being skipped on per-cylinder-firing basis when the ECU is operating in dynamic skip-fire mode. In other embodiments the ECU 20 may determine that a group of fueling events are being skipped during fixed-pattern cylinder deactivation mode operation. If it is determined by step 106 that no fueling event is being skipped, the ECU 20 may return to normal engine mode operation such as that of step 102.

By the embodiment of method 100 illustrated in FIG. 4, ECU 20 is configured to perform a plurality of different deactivation mode accumulator pressure management operations. These accumulator pressure management operations include a first or regular optimized pressure operation 110 and a second or high optimized pressure operation 112. ECU 20 determines which of the plurality of deactivation mode accumulator pressure management operations to perform based on other monitored or then active control parameters. In the embodiment of method 100 illustrated in FIG. 4, for example, at step 108 ECU 20 determines whether an incremental engine load is being requested during the same time period that a fuel delivery event is being skipped (step 106). Examples of monitored or otherwise determined incremental load requests are described above and include a throttle command, a gear shift operation and/or requests to actuate an exhaust aftertreatment system.

If no incremental engine load request is pending or otherwise determined to be present at the time that a fuel delivery event is being skipped (step 108), ECU 20 operates to perform a regular optimized pressure operation 110. During the regular optimized pressure operation 110, ECU 20 compares the then-current pressure within the accumulator 16 (e.g., as monitored by pressure sensor 36) to the MIN pressure level described above (e.g., a minimum operational pressure level) (step 116). If fuel pressure within the accumulator 16 is determined to be less than or equal to the MIN pressure level at step 116, ECU 20 actuates one or more of the metering valves 33 to the closed state. The one or more pumping units 30 with the closed state metering valves 33 will then pump fuel to the accumulator 16 as shown by step 118, and thereby increase the pressure in the accumulator with the objective of maintaining the pressure at the MIN level. In connection with the operation at step 118, ECU 20 may determine whether more than one pumping unit 30 may be needed to achieve the desired fuel load in the accumulator 16. If it is determined that more than one pumping unit 30 is needed, ECU 20 may actuate the valves 33 of more than one pumping units 30 to deliver fuel to the accumulator 16. If the operating condition does not need more than one pumping unit 33 to deliver pressurized fuel to the accumulator 16 to maintain the pressure at the MIN level, the ECU 20 may selectively determine between operating with one or more pumping units 30 based on criteria such as, for example, fuel economy, NVH and pump durability.

If the fuel pressure within the accumulator 16 is determined to be greater than the MIN pressure level at step 116, ECU 20 actuates one or more of the metering valves 33 to the open state (step 120). Operation of the one or more pumping units 30 with the open state metering valves 33 will cause the fuel to be dumped, recirculated or shunted to toward a relatively low pressure system such as the fuel supply 31, or otherwise not pumped into the accumulator 16 as shown by step 122, and thereby preventing an increase in the pressure in the accumulator with the objective of maintaining the pressure at the MIN level. Following the performance of steps 118 or 122, the ECU 20 may return to normal engine mode operation such as that of step 102. Operation of the ECU 20 in the regular optimized pressure operation 110 can reduce the likelihood of over-pressure situations in the accumulator 16, and/or reduce parasitic pumping work by the fuel pump 14 during cylinder deactivation mode operation.

If an incremental engine load request is pending or otherwise determined to be present at the time that a fuel delivery event is being skipped (step 108), ECU 20 operates to perform a high optimized pressure operation 112 in embodiments. During the high optimized pressure operation 112, ECU 20 compares the then-current pressure within the accumulator 16 (e.g., as provided by pressure sensor 36) to the MAX pressure level described above (e.g., a maximum operational pressure level) (step 124). If fuel pressure within the accumulator 16 is determined to be less than or equal to the MAX pressure level at step 124, ECU 20 actuates one or more of the metering valves 33 to the closed state. The one or more pumping units 30 with the closed state metering valves 33 will then pump fuel to the accumulator 16 as shown by step 126, and thereby increase the pressure in the accumulator with the objective of maintaining the pressure at the MAX level. During high optimized pressure operation step 112, ECU 20 can determine the number of pumping units 30 to actuate using algorithms of the type described above in connection with the regular optimized pressure operation 110.

If the fuel pressure within the accumulator 16 is determined to be greater than the MAX pressure level at step 124, ECU 20 actuates one or more of the metering valves 33 to the open state (step 128). Operation of the one or more pumping units 30 with the open state metering valves 33 will cause the fuel to be dumped, recirculated or shunted to toward a relatively low pressure system such as the fuel supply 31, or otherwise not pumped into the accumulator 16 as shown by step 130, thereby preventing an increase in the pressure in the accumulator with the objective of maintaining the pressure at the MAX level. Following the performance of steps 126 or 130, the ECU 20 may return to normal engine mode operation such as that of step 102. Operation of the ECU 20 in the high optimized pressure operation 112 can cause an increase in the parasitic load and/or support the capability of the engine 12 to provide needed power for effective and efficient operation of the engine system 8 and associated systems when the system is being operated in a cylinder deactivation mode.

The capability of the fueling system 10 to provide both the regular optimized pressure operation 110 and the high optimized pressure operation 112 during cylinder deactivation mode operation of the engine system 8 increases the overall effectiveness of the fueling system. Other embodiments of the fueling system 10 may operate using either one or the other of the regular optimized pressure operation 110 or the high optimized pressure operation 112.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

The invention claimed is:

1. A method for operating an engine fueling system to manage fuel in an accumulator supplying fuel to an engine including multiple cylinders, comprising:

monitoring fuel load in the accumulator, wherein the accumulator is a common rail fuel accumulator connected between a high pressure fuel pump and a plurality of fuel injectors, and the high pressure pump is downstream of a lower pressure pump;

determining that the engine is operating in a cylinder deactivation mode during which one or more fueling events to one or more of the cylinders is being skipped;

determining one or more fuel delivery events is being skipped and a pressure management operation for the common rail fuel accumulator during the one or more skipped fuel delivery events; and controlling, in response to the determination that one or more fuel delivery events is being skipped and the pressure management operation and the monitored fuel load in the common rail fuel accumulator, a supply of fuel from the high pressure fuel pump during the one or more skipped fuel delivery events by:

causing fuel to be supplied from the high pressure fuel pump to the common rail fuel accumulator if the monitored fuel load is less than or equal to a first load value; and causing fuel from the high pressure fuel pump to be recirculated, dumped, or shunted and not be supplied to the common rail fuel accumulator if the monitored fuel load is greater than the first load value.

2. The method of claim 1, wherein causing fuel to be supplied from the high pressure fuel pump to the common rail fuel accumulator comprises closing a metering valve to cause the fuel to be supplied from the high pressure fuel pump to the common rail fuel accumulator.

3. The method of claim 1, wherein causing fuel from the high pressure fuel pump to be recirculated, dumped, or shunted and not supplied to the common rail fuel accumulator comprises actuating a metering valve to prevent fuel from being supplied from the high pressure fuel pump to the common rail fuel accumulator.

4. The method of claim 3, wherein actuating the metering valve to prevent fuel from being supplied from the high pressure fuel pump to the common rail fuel accumulator comprises opening the metering valve to cause fuel from the high pressure fuel pump to be recirculated, dumped, or shunted back through an inlet of the metering valve.

5. The method of claim 1 wherein:

determining that the engine is operating in a cylinder deactivation mode comprises determining that the engine is operating in a skip-fire mode; and controlling the supply of fuel comprises controlling the supply of fuel during each fueling event cycle of each deactivated cylinder.

6. The method of claim 1, wherein the first load value is a value representative of a minimum operational load.

7. The method of claim 1 wherein:

the method further comprises determining an incremental engine load request in response to at least one of a throttle command, a gear shift operation, and a request to actuate an aftertreatment system during a time period in which a fuel delivery event is being skipped; and controlling a supply of fuel from the high pressure fuel pump during the time period in which the fuel delivery is being skipped during the cylinder deactivation mode operation in response to the incremental engine load request by:

causing fuel to be supplied from the high pressure fuel pump to the common rail fuel accumulator if the monitored fuel load is less than or equal to a second load value, and wherein the second load value is greater than the first load value; and causing fuel from the high pressure fuel pump to be recirculated, dumped, or shunted and not supplied to the common rail fuel accumulator if the monitored fuel load is greater than the second load value.

8. The method of claim 7, wherein the second load value is a value representative of a maximum operational load.

9. The method of claim 1, wherein monitoring fuel load in the common rail fuel accumulator comprises monitoring fuel pressure in the common rail fuel accumulator, and the first and/or second load values are pressure values.

10. The method of claim 1, wherein determining that the engine is operating in a cylinder deactivation mode comprises receiving a signal representing the cylinder deactivation mode operation.

11. The method of claim 10, wherein receiving a signal representing the cylinder deactivation mode operation comprises receiving a signal representative of each skipped fueling event of each deactivated cylinder.

12. The method of claim 10, wherein the first load value defines an operational minimum load value of the common rail fuel accumulator.

13. A control unit configured to implement the method of claim 1.

14. A fueling system comprising the control unit of claim 13.

15. A method for operating an engine fueling system to manage fuel in an accumulator supplying fuel to an engine including multiple cylinders, comprising:

monitoring fuel load in the accumulator, wherein the accumulator is a common rail fuel accumulator connected between a high pressure fuel pump and a plurality of fuel injectors, and the high pressure pump is downstream of a lower pressure pump;

determining that the engine is operating in a cylinder deactivation mode during which one or more fueling events to one or more of the cylinders is being skipped;

determining an incremental engine load request in response to at least one of a throttle command, a gear shift operation, and a request to actuate an aftertreatment system during a time period in which a fuel delivery event is being skipped with the engine operating in the cylinder deactivation mode; and controlling a supply of fuel from the high pressure fuel pump in response to the incremental engine load request and the monitored fuel load in the common rail fuel accumulator during the time period in which fuel delivery is being skipped while operating in the cylinder deactivation mode by:

causing fuel to be supplied from the high pressure fuel pump to the common rail fuel accumulator if the monitored fuel load is less than or equal to a second load value, wherein the second load value is greater than a first load value that defines an operational load of the common rail fuel accumulator; and causing fuel from the high pressure fuel pump to be recirculated dumped, or shunted and not be supplied to the common rail fuel accumulator if the monitored fuel load is greater than the second load value.

16. The method of claim 15, wherein the second load value is a value representative of a maximum operational load.

17. The method of claim 15, wherein causing fuel to be supplied from the high pressure fuel pump to the common rail fuel accumulator comprises closing a metering valve to cause the fuel to be supplied from the high pressure fuel pump to the common rail fuel accumulator.

18. The method of claim 15, wherein causing fuel from the high pressure fuel pump to be recirculated, dumped, or shunted and not supplied to the common rail fuel accumulator comprises actuating a metering valve to prevent fuel from being supplied from the high pressure fuel pump to the common rail fuel accumulator.

19. The method of claim 18, wherein actuating the metering valve to prevent fuel from being supplied from the high pressure fuel pump to the common rail fuel accumulator comprises opening the metering valve to cause fuel from the high pressure fuel pump to be recirculated, dumped, or shunted back through an inlet of the metering valve.

20. The method of claim 15 wherein:

determining that the engine is operating in a cylinder deactivation mode comprises determining that the engine is operating in a skip-fire mode; and controlling the supply of fuel comprises controlling the supply of fuel during each fueling event cycle of each deactivated cylinder.

21. The method of claim 15, wherein monitoring fuel load in the common rail fuel accumulator comprises monitoring fuel pressure in the common rail fuel accumulator, and the first and/or second load values are pressure values.

22. The method of claim 15 wherein:

determining that the engine is operating in a cylinder deactivation mode comprises receiving a signal representing the cylinder deactivation mode operation; and determining that the incremental engine load is requested comprises receiving a signal representative of an incremental engine load request.

23. The method of claim 22, wherein receiving a signal representing the cylinder deactivation mode operation comprises receiving a signal representative of each skipped fueling event of each deactivated cylinder.

24. A control unit configured to implement the method of claim 15.

25. A fueling system comprising the control unit of claim 24.

* * * * *